March 13, 1962  D. E. LAWSON  3,024,500
APPARATUS FOR DRY MIXING OF MATERIAL
Filed March 28, 1960  2 Sheets-Sheet 1
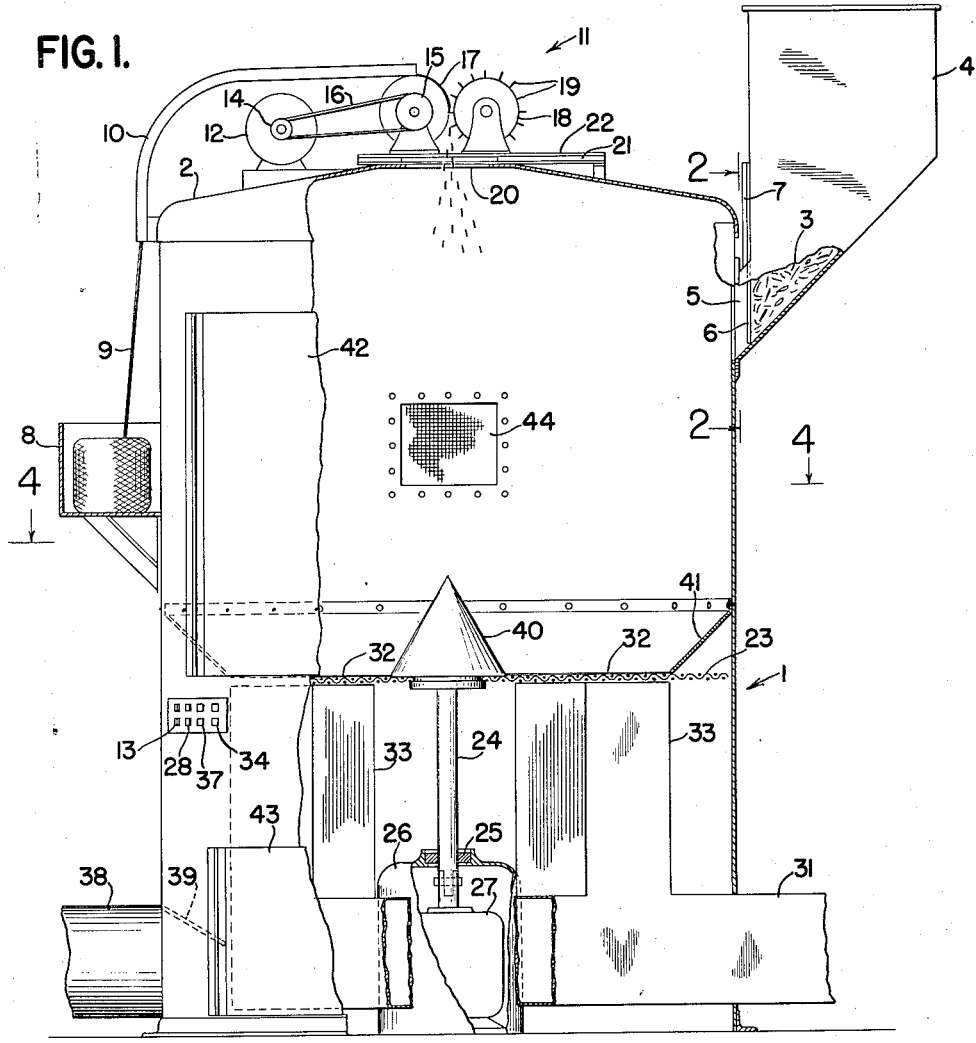
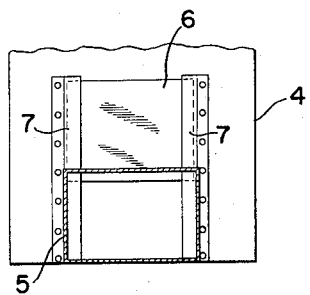
INVENTOR.
DAVID E. LAWSON
BY ANDRUS & STARKE
Attorneys March 13, 1962 D. E. LAWSON 3,024,500
APPARATUS FOR DRY MIXING OF MATERIAL
Filed March 28, 1960 2 Sheets-Sheet 2

INVENTOR.
DAVID E. LAWSON
BY ANDRUS & STARKE
Attorneys

United States Patent Office 3,024,500
Patented Mar. 13, 1962

3,024,500
APPARATUS FOR DRY MIXING OF MATERIAL
David E. Lawson, 2021 Middleton Beach Road,
Middleton, Wis.
Filed Mar. 28, 1960, Ser. No. 18,129
8 Claims. (Cl. 19—145.5)

This invention relates to an apparatus for dry mixing of material, and more particularly to an apparatus for thoroughly mixing batches of fibrous or similar material prior to subsequent treatment, such as molding.

In the manufacture of molded products comprising a combination of different materials, such as wood chips and glass fibers, it is essential that a thorough mixing or interspersion of the materials is accomplished prior to molding. A uniform product will then result.

The apparatus of the present invention is fully capable of accomplishing the desired result, and provides an alternating suction and air blast treatment to the material to provide the necessary turbulence, as well as dirt removal and drying functions.

The accompanying drawings illustrate the best mode presently contemplated by the inventor for carrying out the invention.

In the drawings:

FIGURE 1 is a side elevation of a mixing apparatus constructed in accordance with the invention, with parts broken away and in section;

FIG. 2 is a fragmentary vertical section taken on line 2—2 of FIGURE 1, and showing the hopper gate;

Figure 3:
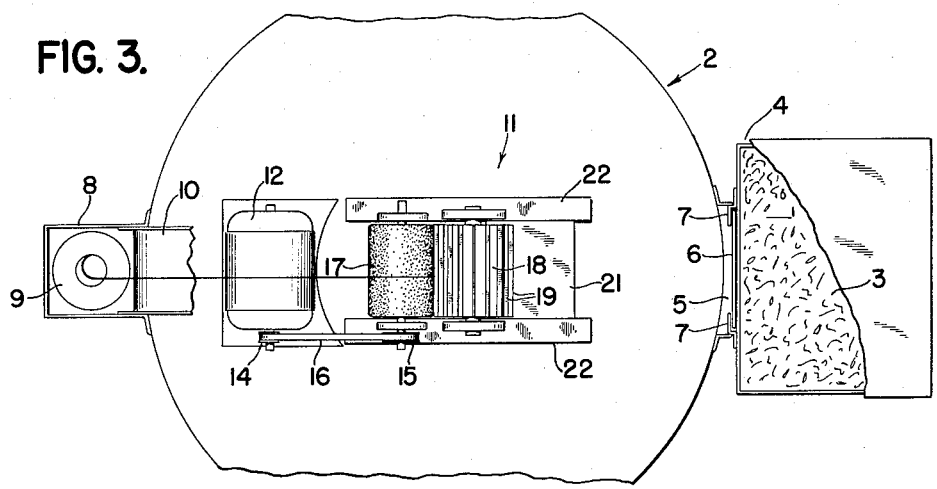
FIG. 3 is a top plan view of the apparatus, showing the strand cutter.
Figure 4:
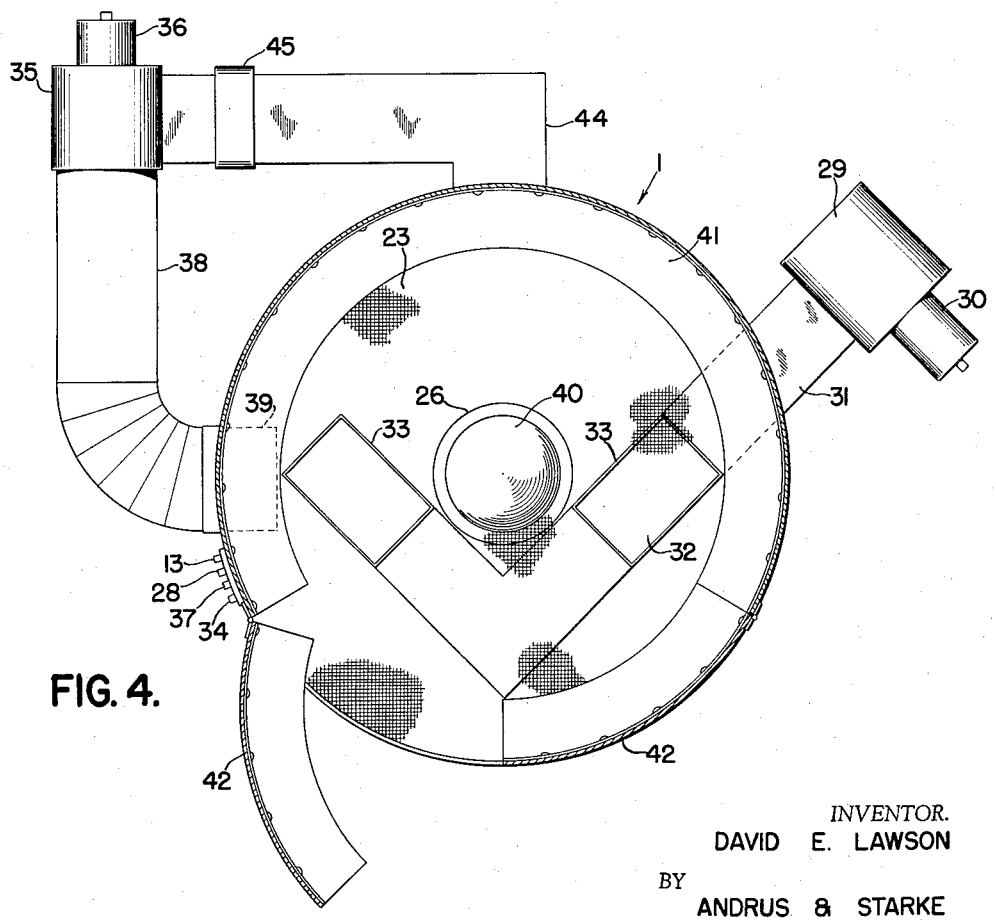
FIG. 4 is a horizontal section of the apparatus taken on line 4—4 of FIGURE 1, and with a portion of the screen broken away to show the air conduits.

As shown in the drawings the apparatus of the invention comprises a relatively large cylindrical tank 1 adapted to stand upright and having a top end portion 2.

Wood chips 3, or other suitable relatively coarse material, are supplied to the interior of tank 1 from a hopper 4 mounted on the upper portion of the tank wall. A chute 5 connects hopper 4 to the tank interior, and is provided with means for controlling flow of chips therethrough. For this purpose, a gate 6 is mounted on tracks 7 on the tank wall and is adapted to be raised and lowered to selectively open or close off the chute.

To supply the necessary fine fibers, such as glass fibers, to tank 1, a support 8 is mounted on the exterior of the tank. Support 8 is adapted to receive a length of fiber glass strand or roving 9 which may be wound in a ball, roll or the like. A length of roving 9 is extended upwardly from support 8 and passes over a trough-like guide 10 mounted on top 2 and into a cutting apparatus, indicated generally at 11.

Cutting apparatus 11 comprises a motor 12, which is mounted on top 2 and which may be selectively actuated by a suitable switch 13. Motor 12 is connected through pulleys 14 and 15, and a belt 16 to rotatably actuate a driven roll 17 of rubber or other suitable material.

Glass roving 9 is adapted to pass over roll 17 and downwardly between the roll and a steel cutting roll 18 having a plurality of circumferentially spaced knives 19 thereon. As roving 9 is pulled through guide 10 by the friction of rubber roll 17 and passes over the latter, it is successively severed into short pieces of predetermined length by knives 19 and falls through an opening 20 in top 2 and into tank 1. The length of roving pieces introduced into the tank will depend on the circumferential distance between knives 19.

Opening 20 is selectively opened and closed by operating a sliding door 21 mounted on tracks 22 on top 2.

The relative percentage of wood chips 3 and roving 9 initially introduced into tank 1 will depend on the particular batch requirements. As these materials are fed into the tank, they will fall onto a large horizontally disposed circular perforated screen 23 which separates tank 1 into upper and lower chambers. The mesh size of screen 23 is such as to prevent the chips or roving from falling therethrough, but will permit dust or other fine foreign matter to pass through.

Screen 23 extends substantially to the tank wall, and is supported and rotatably driven at the center by a drive shaft 24. Shaft 24 extends downwardly into the lower tank chamber and through a bearing 25 mounted in the upper end portion of a drive housing 26, with the shaft being rotated by a motor 27 or other suitable mechanism. Control of motor 27 may be by a suitable switch 28.

When motor 27 is actuated, screen 23 will rotate, carrying chips 3 and roving 9 with it. In order to fully mix the materials, it is necessary to provide a high degree of turbulence within the upper tank chamber. For this purpose, a blower 29 is provided outside tank 1. Blower 29 may be operated by a motor 30 and connects through a horizontal duct 31 into the interior of the lower tank chamber, with the duct shown making a right angle bend around drive housing 26. Duct 31 is provided with a pair of upwardly extending openings 32 which are disposed generally diametrically on opposite sides of housing 26. Duct 31 may be disposed directly beneath screen 23, or, alternately, the duct may be disposed at the bottom of tank 1 with upward extensions 33 to direct air passing through openings 32.

When motor 30 is actuated by a switch 34, and screen 23 rotated, the wood chips 3 and roving 9 will be shot upwardly by the inwardly directed stream of air as they pass over the pair of openings.

At the same time a vacuum or suction force is applied beneath screen 23. This suction is created by a second blower 35 mounted outside tank 1 and operated by a motor 36 or the like, the latter being manually controlled by a switch 37. Blower 35 is connected in reverse manner so that its inlet is connected through a duct 38 to the lower wall of tank 1 and thus into the lower chamber. Operation of blower 35 will therefore create a suction force or stream of air through screen 23 at all points thereon, except where it is blocked above openings 32 or extensions 33. A baffle 39 may be placed adjacent the joint between duct 38 and tank 1, for purposes to be described.

As the chips 3 and roving 9 are shot upwardly by blower 29, they are shortly thereafter subjected to the suction force from blower 35 and pulled downwardly onto screen 23 by the outwardly passing stream of air. The alternating upward and downward forces cause sufficient turbulence to thoroughly mix the materials together.

In addition, the sudden shocks on the roving have been found to further separate it from multiple strands into a high percentage of single strands.

Furthermore, when the mixture is in the air and also laying on screen 23, the suction from blower 35 acts to pull any dust or foreign particles therefrom and down through the screen mesh. Baffle 39 will help prevent such foreign particles from reaching blower 35.

It has been found that, as the mixture settles downwardly onto screen 23, it tends to collect at the center thereof. To prevent this phenomenon, a cone-shaped deflector member 40 is mounted centrally of screen 23 and with the point thereof extending upwardly. Cone 40 may be mounted for rotation with screen 23, or may be mounted independently thereof in any suitable manner. Any mixture being sucked downwardly adjacent the center of screen 23 will be drawn outwardly away from the center thereof by passing over the cone surface.

In addition, any tendency of the downwardly moving mixture to collect at the edge of the screen is prevented by an annular deflector apron or skirt 41 disposed about the periphery of the screen and tapered downwardly toward the center thereof. The suction from blower 35 will cause the downwardly moving material to be drawn inwardly over the surface of skirt 41.

Air blast openings 32 are positioned and proportioned as to extend substantially the full distance between cone 40 and skirt 41, so that no material escapes the effect of the upwardly moving air stream.

Access to the upper tank chamber may be gained through a plurality of doors 42 formed in the tank wall. As shown, the lower edges of doors 42 are close to the level of screen 23 so that skirt 41 is segmentalized and portions thereof are fastened to the doors.

Access to the lower tank chamber for repairs, cleaning, etc., may be gained through a plurality of similar doors 43 disposed in the lower tank wall.

In some instances, wood chips 3 may contain an excess amount of moisture when they are fed into tank 1 from hopper 4. To assure that the chips are suitably dry at the end of mixing, a warm air duct 44 connects with the interior of the upper tank chamber. Warm dry air is supplied through duct 44 from a suitable blower and heater apparatus. If desired, the outlet of suction blower 35 may be connected with duct 44, and a suitable heater 45 disposed along the latter.

The invention provides a novel apparatus for mixing different materials, such as wood chips and glass fibers. The materials are subjected not only to a rotary motion, as by screen 23, but are also subjected to alternating turbulence forces applied in opposite directions which keep the particles from sticking together. The suction force is utilized, not only to draw the material downwardly, but also to draw it away from the center and edges of the screen, by pulling it over the surfaces of cone 40 and skirt 41. In addition, a heating medium is supplied to the mixture to assure the proper dryness.

Various modes of carrying out the invention are contemplated as being within the scope of the following claims particularly pointing out and distinctly claiming the subject matter which is regarded as the invention.

I claim:

1. Apparatus for dry mixing of material, comprising, a closed chamber for containing the material, a perforated support for the said material disposed within said chamber, alternately positioned turbulence producing means for applying upward and downward forces through said support and to the said material, and means to move said support past said turbulence producing means so that said material is alternately subjected to said upward and downward forces and thereby mixed.

2. Apparatus for dry mixing of material, comprising, a closed chamber for containing the said material, a perforated screen disposed within said chamber for supporting the said material, means to create a stream of air passing through a portion of said screen and out of said chamber, means to supply a stream of air through a portion of said screen and into said chamber, and means for moving said screen so that said material is carried alternatingly from one said stream of air to the other.

3. Apparatus for dry mixing of material, comprising, an annular closed chamber for containing the said material, a perforated disc-like screen disposed at one end of said chamber for supporting said material, means to create a stream of air passing through said screen and out of said chamber to draw the material toward said screen, means to supply a stream of air through said screen and into said chamber to push said material away from said screen, and deflecting means to move said material away from the center and the edge of said screen as the material is drawn toward the screen by said first-named means.

4. The apparatus of claim 3 in which the deflecting means comprises, a conical member disposed at the center of the screen with the point of said conical member extending into the chamber to deflect material toward the periphery of the screen, and an annular skirt extending around the periphery of said screen with said skirt being shaped to deflect material toward said conical member.

5. The apparatus of claim 4 which includes means for supplying warm dry air to said chamber to dry the material being mixed therein.

6. Apparatus for dry mixing of material, comprising, an annular closed chamber for containing the said material, a disc-like screen disposed at the bottom of said chamber for supporting said material, suction producing means to create a stream of air passing through a portion of said screen and out of said chamber to draw the material downwardly and onto said screen and to withdraw fine foreign particles therethrough; air blast producing means disposed directly beneath said screen to supply a stream of air through a portion of said screen and into said chamber to cause said material to be raised from the screen, said air blast producing means including a plurality of circumferentially spaced openings disposed to substantially block the action of said suction producing means at the portions of the screen directly above said openings; means to rotate said screen, so that said material will be alternately subjected to the action of said suction producing means and said air blast producing means, a conical member disposed at the center of the screen with the point of said conical member extending into the chamber to deflect material toward the periphery of the screen, an annular skirt extending around the periphery of said screen with said skirt being shaped to deflect material toward said conical member, and means for supplying warm dry air to said chamber to dry the material being mixed therein.

7. Apparatus for dry mixing of wood chips and glass fibers or the like preparatory to molding, comprising, a chamber, means for supplying the wood chips to said chamber, means for supplying single and multiple strands of glass fibers to said chamber, an annular member disposed within said chamber for supporting said wood chips and glass fibers, means to rotate said annular member, and means to subject said wood chips and glass fibers to turbulence producing forces in alternately upward and downward directions while said annular member is being rotated to thereby mix the said chips and fibers and to thereby separate a high percentage of said multiple strands into single strands.

8. Apparatus for dry mixing of material, comprising, a closed chamber for containing the said material, a perforated support for said material and disposed within said chamber, means to create a stream of air passing through a portion of said perforated support and out of said chamber, means to supply a stream of air through a portion of said perforated support and into said chamber, and means for moving said perforated support so that said material is carried alternatingly from one said stream of air to the other.

References Cited in the file of this patent
UNITED STATES PATENTS 2,292,897    Nielson    Aug. 11, 1942
2,750,681    Berry    June 19, 1956